Figure 1:
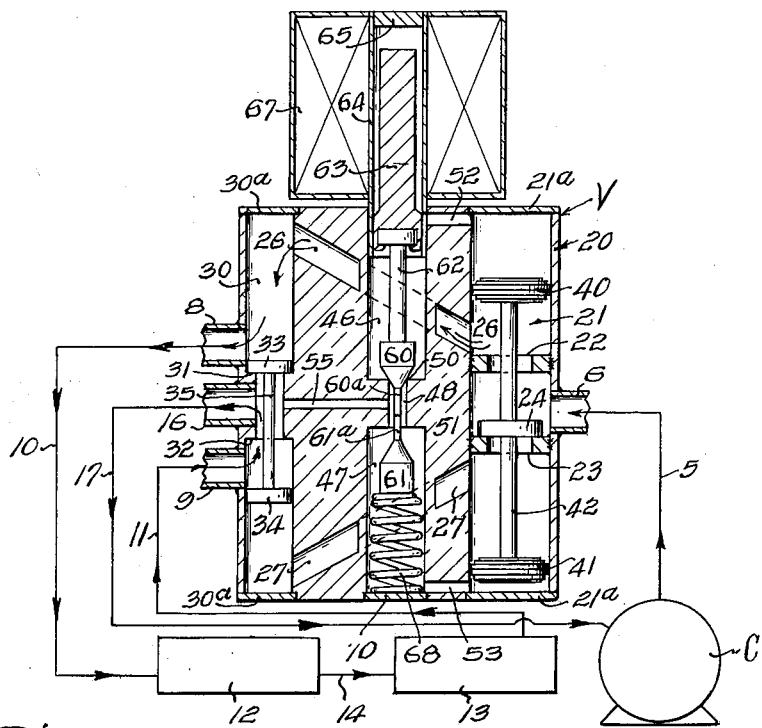

June 19, 1962  E. C. RANEY  3,039,491
VALVE MECHANISM FOR FLUID SYSTEMS
Filed July 15, 1959

INVENTOR:
ESTEL C. RANEY.
BY Roy E. Raney
ATTORNEY

United States Patent Office 3,039,491
Patented June 19, 1962

3,039,491
VALVE MECHANISM FOR FLUID SYSTEMS
Estel C. Raney, Fort Lauderdale, Fla., assignor to Ranco Incorporated, Columbus, Ohio, a corporation of Ohio
Filed July 15, 1959, Ser. No. 827,277
4 Claims. (Cl. 137—625.5)

The present invention relates to an improved valve mechanism for controlling flow in fluid systems, such as refrigerant in reverse cycle refrigerating systems.

It is known to actuate the main flow controlling valve members in fluid flow systems by a piston which moves in a cylinder when opposite faces thereof are subjected to a fluid pressure differential in the system occasioned by bleeding the cylinder on one side of the piston to a low pressure side of the system while the other side of the piston is subjected to the high pressure of the system, the bleeding being controlled by a relatively small flow, low power solenoid valve. By such arrangement, fluid pressure within the system is utilized to provide a considerable force for shifting valve members to control the flow of fluid, and this force may be controlled by a relatively low powered device, such as a solenoid operated pilot valve. To permit reverse movement of the piston, a bleed passage is usually provided from one side of the piston to the other, but of lesser flow than the bleed from the cylinder. One difficulty with such known types of valves is the problem of preventing loss of fluid through the bleed passage after the piston has shifted the valve parts. This loss occurs when the pilot valve is retained open, which is often the most convenient control arrangement. It has been proposed to cause the piston to operate additional valve means to close the controlled bleed passage at the end of the piston work stroke, but such valve means are relatively expensive and present manufacturing problems.

The object of the present invention is the provision of a novel combination of a main flow control valve means which is actuated by a bleed type piston means controlled by a pilot valve in the bleed passage thereof and which main flow valve means is effective to prevent flow of fluid to the bleed passage after the piston means has actuated the valve means. The improved valve mechanism comprises a valve member shiftable to open and close alternate main flow control valve ports by opposed pistons each operating in a cylindrical section having one end in communication with the fluid flowing through the respective valve ports so that the piston in whichever cylindrical section is open to the fluid flow by way of the open valve port can be actuated to shift the valve member by bleeding the other end of this last mentioned section through a pilot valve controlled bleed passage, thereby causing the piston to be driven toward the bled end to move the valve member from the closed port and close the last open port, thus blocking with the main valve member any flow of fluid to the cylinder having the open bleed passage so that the pilot valve controlling the latter passage can be retained open without loss of fluid therethrough.

A further object of the invention is to arrange the valve ports, the valve member and the operating pistons for the valve member in a single cylindrical structure, thereby minimizing the cost of construction while providing the highest efficiency of operation.

Figure 2:
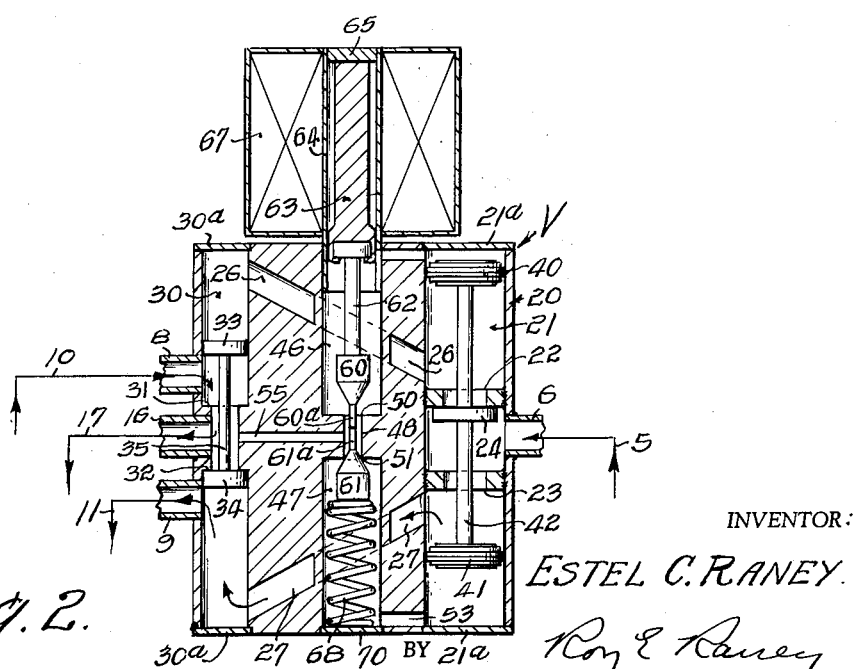

Other objects and advantages of the invention will be apparent from the following description of a preferred form of the invention, reference being made to the accompanying drawings wherein FIG. 1 is a schematic illustration of a reversible cycle refrigerating system of the so-called "heat-pump" type, showing my improved reversing valve mechanism therein for reversing the order of flow of refrigerant through the heat exchangers of the system, the valve mechanism being shown in section; and FIG. 2 is a sectional view of the valve mechanism shown in FIG. 1, but showing certain parts in different positions.

Although the valve mechanism of the invention may be used to control the fluid flow in various types of systems, it is particularly suitable for selectively reversing the order of flow of refrigerant through heat exchangers of the well known compressor-condenser-expander type refrigerating system. Referring to FIG. 1, of the drawings, the refrigerating system comprises a compressor C which is essentially a pump, having the high pressure discharge thereof connected by a pipe 5 to the inlet 6 of the improved valve mechanism indicated generally at V. As is described in detail hereinafter, valve V includes reversible flow passages including line connections 8 and 9 which are connected by pipes 10 and 11 respectively, with one end of two heat exchangers 12 and 13 respectively, which are interconnected by a restrictor tube 14, and each exchanger may serve as either a refrigerant condenser or evaporator, depending upon the direction of flow of refrigerant therethrough. Assuming the heat pump system shown is adapted to heat and cool the air of a room, out-door air is arranged to be circulated over heat exchanger 12 by blowers, not shown, and exchanger 13 is arranged to have room air circulated thereover by suitable blowers, not shown. Such systems are well known in the art and further description thereof is unnecessary to the understanding of the present invention. During the period it is desired to cool the room air, valve V is operative to direct refrigerant entering inlet 6 from the compressor through connection 8 and pipe 10 to exchanger 12 where the refrigerant is cooled and condensed and from which it then flows through restrictor 14 to exchanger 13 where the refrigerant is vaporized and absorbs heat from the walls of the exchanger. The vaporized refrigerant is returned to the compressor through pipe 11 to connection 9 of valve V and whereupon the gas is directed through discharge outlet 16, which is connected by pipe 17 to the intake or suction side of the compressor.

If it is desired to heat the room, valve V is operated to cause the refrigerant entering inlet 6 to flow outwardly through connection 9, through pipe 11 into exchanger 13, where the refrigerant is cooled and condensed, giving up heat to the air passed thereover, and the condensed refrigerant then passes through restrictor 14 to exchanger 12 where it is vaporized after which it passes through pipe 10 to connection 8 and from outlet 16 through pipe 17 to the intake of the compressor.

Referring now to the construction of valve V, in the preferred form, the valve comprises a body 20, which may be a section of a brass extrusion, having a cylinder 21 bored therethrough, and the ends of which are closed by plates 21a brazed to the body. Two spaced opposed valve ports 22, 23 are provided in the central portion of cylinder 21, and these may comprise annular members brazed to the walls of the cylinder. The inlet 6 opens into cylinder 21 intermediate ports 22 and 23, which ports face inwardly and present spaced valve seats which are alternately opened and closed by a poppet type valve member 24 so that the full flow of refrigerant passes through whichever port is opened. Preferably, suitable resilient material is provided on member 24 or the seats to enhance the sealing of the ports, but since such expediency is well known, it is not shown here.

Alternate main flow passages lead from cylinder 21 at the outer sides of ports 22 and 23 and they comprise cross-drilled bores 26 and 27 which lead to opposite ends of a second bored cylinder 30, which cylinder is closed at its ends by plates 30a brazed to the valve body, and which has side openings to receive tubular sections which are brazed therein to form connections 8, 9 and outlet 16. The central section of cylinder 30 opposite outlet 16 is reduced in diameter to provide outwardly facing valve seats 31 and 32 which lie in planes below and above outlet 16, respectively. Seats 31 and 32 are alternately closed by poppet type valve members 33 and 34 which are attached to opposite ends of a stem 35, the length of which is such that when one valve member is closed on its seat the other is removed from its seat and positioned beyond the reverse flow connection 8 or 9, as the case may be, and vice-versa. The diameters of valve members 33 and 34 are close to that of the cylinder so that fluid flowing from the ends of the cylinder toward reverse flow connections 8 or 9 force the valve members inwardly to their respective seats. Thus, when fluid flows through valve port 22, passage 26, and into cylinder 30, it forces valve member 33 to seat 31, and is thereby directed through connection 8. Refrigerant returning to the valve mechanism through connection 9 is then directed through seat 32 to outlet 16. When the flow of fluid is through port 23, passage 27 and into the lower end of cylinder 30, valve member 34 is driven thereby to seat 32 and, simultaneously, valve member 33 is removed from seat 32 and positioned above reverse connection 8 so that the refrigerant is then directed out reverse connection 9 and returns from exchanger 12 to connection 8, where it is then directed through valve seat 31 to outlet 16 and returned to the compressor. It will be understood that valve members 33 and 34 do not necessarily have a leak-proof fit with the walls of cylinder 30.

Valve member 24 is actuated to selectively close either port 22 or 23 by two pistons 40 and 41 which are attached to the end of a piston rod 42 to which valve member 24 is connected. The diameters of pistons 40 and 41 are appreciably in excess of the open areas of valve ports 22 and 23 so that the same pressure on either piston and the valve member results in the piston tending to shift the valve. As seen in the drawings, rod 42 extends axially through ports 22 and 23, and the length of the rod is such that when valve member 24 is closed on seat 23, piston 31 is spaced slightly from the lower end of cylinder 21 and piston 30 is disposed well below the upper end of the cylinder but above the opening of bore 26 into the cylinder. When valve member 24 is closed on port 22, as seen in FIG. 2, piston 40 is spaced slightly from the upper end of the cylinder and piston 41 is disposed below the opening of passage 27 into the cylinder. Means is provided to permit a relatively slight flow of fluid from one side of the pistons to the other, and preferably, this is achieved by providing an inefficient fit between the pistons and cylinder walls. This expedient reduces the care and expense in fabricating the piston structure.

It will be apparent to those familiar with the art that the pressure of the refrigerant in the system between the discharge of the compressor and the entering end of restricter 14 will be relatively high and that the refrigerant pressure between the opposite end of restricter 14 and the intake or suction side of the compressor will be relatively low. Hence, the refrigerant pressure in cylinder 21 at inlet 6 is the maximum in the system and the pressure in cylinder 30 at outlet 16 is the minimum in the system. Furthermore, the pressure differential on opposite sides of valve member 24 when the latter is closed on one of its seats or the other will normally correspond to the maximum differential of pressure in the system. For this reason the valve member will be urged tightly to the seats whereby leak proof seal can be easily effected.

As indicated previously, pistons 40 and 41 are actuated by alternately and selectively bleeding the outer ends of the cylinders to the low side of the system through a pilot valve, and for this purpose two axially aligned cylinders 46 and 47 are drilled in body 20, and these cylinders are interconnected by an axial bore 48 of relatively small diameter, the ends of which form outwardly facing pilot valve ports 50 and 51 at the inner ends of the respective cylinders. Preferably, the axis of cylinders 46 and 47 is off set from a plane through the axes of cylinders 21 and 30 to facilitate manufacture of the valve mechanism and provide all internal fluid connections between the valve elements. The outer ends of the cylinders 46 and 47 are connected with the ends of cylinder 21 by passages 52 and 53 which are of relatively small diameters. The bore 48 between pilot valve ports 50 and 51 is connected with cylinder 30 between valve seats 31 and 32 by a bore 55. Thus, the portions of cylinder 21 at the outer sides of pistons 40 and 41 can be connected to the suction or intake side of the refrigerating system through the pilot valve ports 50 and 51, which ports are alternately opened and closed by pilot valve members 60 and 61 described more fully hereinafter.

Pilot valve member 60 is tapered to engage in port 50 and is attached by a stem 62 to an armature 63 which is guided in a non-ferrous sleeve 64 brazed into the upper end of cylinder 46. The outer end of sleeve 64 is closed by a plug 65, and the sleeve is surrounded by a solenoid 67 which is operative when energized to raise armature 63 and remove valve member 60 from seat 50. Valve member 61 is carried on the upper end of a tension spring 68 which rests on a closure plate 70 brazed into the lower end of cylinder 47. Valve members 60 and 61 have pin-like shanks 60a and 61a projecting therefrom and the ends of which engage to space these valve members so that when solenoid 67 is de-energized the weight of armature 63 forces valve members 60 and 61 downwardly, by compressing spring 68, whereby pilot port 50 is closed by member 60 and member 61 is removed from port 51. When solenoid 67 is energized, armature 63 raises valve 60 from port 50, and spring 68 then closes valve 61 on seat 51. The areas of valve ports 50 and 51 are relatively small so that a low powered solenoid means can be used to actuate the valve members against relatively high pressure differentials.

The control circuit for solenoid 67 is not shown, but it will be understood by those familiar with the art that such circuit may include a manual or thermostatically operated switch, as desired.

The advantages of the arrangement described is apparent from a consideration of the operation of the valve mechanism. Referring to FIG. 1 the parts of the valve are shown as positioned when solenoid 67 is de-energized, and when compressor C is operating, high pressure refrigerant enter inlet 6, passes through port 22, passage 26, cylinder 30, out connection 8 and returns through connection 9, valve seat 32 to outlet 16 and back to the compressor. Pilot valve 60 is closed on pilot port 50, and since piston 40 is exposed to high pressure refrigerant passing through main valve port 22 and some leakage of refrigerant occurs thereabout, the pressures on opposite sides of the piston are equalized. The underside of valve member 24 is exposed to the low pressure side of the system through passage 27, lower end of cylinder 30, leakage about valve member 34 to outlet 16; consequently, member 24 is urged to its seat by the full pressure differential in the system and a leak-proof seating is easily effected. Valve member 24 in closing main port 23 not only prevents leakage of high pressure refrigerant through passage 27 to cylinder 30 and outlet 16, but also prevents leakage to outlet 16 through the bleed passage 53, open pilot valve seat 51 and passage 55.

When it is desired to reverse the flow of refrigerant through the exchangers 12 and 13, solenoid 67 is energized which causes valve member 60 to be removed from pilot valve seat 50, thereby permitting valve member 61 to close on pilot valve seat 51. This action connects the upper end of cylinder 21 with the low side of the system through passage 52, pilot valve seat 50 and passage 55, as described, and since the underside of piston 40 is directly exposed to the high pressure refrigerant passing through main valve port 22 and moving through passage 26, the piston is forced upwardly, removing valve member 24 from seat 23 and closing it on seat 22. This action diverts the main flow of refrigerant from port 22 through passage 27, into the lower end of cylinder 30 thereby forcing valve member 34 upwardly, removing member 33 from seat 31 and closing member 34 on seat 32 so that the high pressure refrigerant is directed through connection 9, to the heat exchangers, as described, and the return flow from the exchangers enters cylinder 30 through connection 8 and is then directed through seat 31 to the outlet 16, as indicated by arrows in FIG. 2. Valve member 24 is urged to port 22 by the pressure differential in the system thereby tightly sealing port 22 which prevents escape of refrigerant to the low side through the open bleed passage 52.

When solenoid 67 is de-energized to again reverse the direction of flow through the exchangers, fluid flow through bleed passage 52 is blocked by valve member 60 closing on seat 51 and bleed passage 53 is opened at seat 51 which effects a high pressure differential on opposite faces of piston 41 which drives the piston to the position shown in FIG. 1. The leakage of refrigerant about pistons 40 and 41 permits the pistons to be moved in their cylindrical sections by the action of the other piston. The rate of this leakage, however, should be somewhat less than the flow rate through pilot valve seats 50 or 51 to assure an appreciable pressure differential for operating the pistons as described.

It will be seen that by the novel valve arrangement, the main flow control valve is effective to close off communication between the main flow of fluid and the open bleed passages, thereby simplifying the construction of the valve while providing maximum efficiency.

While but one form of the invention has been disclosed, it will be understood that other modifications and adaptations can be made all falling within the scope of the claims which follow.

I claim:

1. A valve mechanism comprising means forming an inlet chamber having two spaced valve ports therein and a fluid inlet opening intermediate said ports, means forming main fluid passages from each of said ports, a poppet type valve member in said chamber intermediate said ports and movable from one port to the other to alternatively seal said ports to close the respective main fluid passages, said member being urged to the respective ports by fluid pressure entering said chamber, means to shift said valve member from one port to the other comprising two opposed cylinder structures each open at one end to the respective main fluid flow passages leading from said ports respectively, a piston in each cylinder and connected to said valve member and reciprocable in its cylinder by differential in fluid pressure on opposite sides thereof, a bleed passage leading from each of said cylinders beyond the piston therein, and means to control the flow of fluid through said bleed passages.

2. A valve mechanism comprising, a valve body including a cylinder formed therein and having an inlet intermediate the ends thereof, two opposed valve ports in said cylinder at opposite sides of said inlet, a valve member movable from one of said ports to the other to alternatively open and close said ports, a fluid flow chamber in said body spaced from said cylinder and having a main fluid flow outlet and two reverse flow passages, means forming two alternate flow passages from said cylinder to spaced points in said chamber, said passages leading from said cylinder on the downstream side of the respective valve ports, valve means in said chamber to alternately provide and prevent communication between said reverse flow passages and said outlet, means forming two bleed passages interconnecting the ends of said cylinder with said main fluid flow outlet and opening in said cylinder downstream of the respective valve ports, two pistons in said cylinder disposed to reciprocate therein between the respective openings of said alternate flow passage and bleed passages in said cylinder, means operatively connecting said pistons with said valve member, and means to control the flow of fluid through said bleed passages comprising a pilot valve chamber in said body, said bleed passages entering said pilot valve chamber at spaced openings, and valve means for alternately opening and closing the last mentioned openings.

3. In a valve mechanism, a valve body including a first chamber having a fluid inlet and two outlet ports, a valve member movable alternatively to close one or the other of said outlet ports, means forming a fluid flow passage from the respective outlet ports, said body having a second chamber into which said flow passages open at spaced inlets, said second chamber having an outlet, valve means in said second chamber intermediate said outlet and the respective inlets to said second chamber for alternatively blocking flow of fluid from one of the last-mentioned inlets to said outlet, said body including two cylindrical sections each having one end open to the respective fluid flow passages, said body including a bleed passage leading from each cylindrical section at the end thereof opposite the end open to the flow passage and communicating with the outlet of said second chamber, a piston in each cylindrical section operatively connected to said valve member and movable in said section between the openings therein to said fluid flow passage and said bleed passage and operative to shift said valve member from one of said outlet ports to the other, and valve means to selectively open and close one or the other of said bleed passages.

4. A valve mechanism comprising means forming an inlet chamber having two spaced valve ports therein and a fluid inlet opening intermediate said ports, means forming main fluid passages from the downstream side of each of said ports, a poppet valve member in said chamber intermediate said ports and movable from one port to the other to alternatively seal said ports to close the respective main fluid passages, said member being urged to the respective ports by fluid pressure entering said chamber, means to shift said valve member from one port to the other comprising two cylinder structures one end of which is in communication with the respective main fluid passages, a fluid bleed passage leading from each cylinder at a point spaced from said one end, a piston in each cylinder connected to said valve member and reciprocable in each cylinder between said one end and the bleed passage opening therein by differential in fluid pressure on opposite ends thereof, and means to control the flow of fluid through said bleed passages.

References Cited in the file of this patent

UNITED STATES PATENTS

| | | |
|---|---|---|
| 2,616,449 | Maha | Nov. 4, 1952 |
| 2,641,281 | Phillips | June 9, 1953 |
| 2,672,887 | Tipton | Mar. 23, 1954 |
| 2,765,628 | Anthony | Oct. 9, 1956 |
| 2,775,982 | Canfield | Jan. 1, 1957 |
| 2,802,484 | Sheets | Aug. 13, 1957 |
| 2,823,691 | Chatham | Feb. 18, 1958 |
| 2,875,780 | Martin | Mar. 3, 1959 |

FOREIGN PATENTS

| | | |
|---|---|---|
| 438,322 | France | Mar. 12, 1912 |
| 1,032,052 | Germany | June 12, 1958 |